US012033388B2

(12) United States Patent
Wang et al.

(10) Patent No.: US 12,033,388 B2
(45) Date of Patent: Jul. 9, 2024

(54) POSITIONING METHOD, APPARATUS, DEVICE, AND COMPUTER-READABLE STORAGE MEDIUM

(71) Applicant: Tencent Technology (Shenzhen) Company Limited, Shenzhen (CN)

(72) Inventors: Tao Wang, Shenzhen (CN); Yifan Yu, Shenzhen (CN); Yunfei Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 380 days.

(21) Appl. No.: 17/379,829

(22) Filed: Jul. 19, 2021

(65) Prior Publication Data

US 2021/0350572 A1 Nov. 11, 2021

Related U.S. Application Data

(63) Continuation of application No. PCT/CN2020/084148, filed on Apr. 10, 2020.

(30) Foreign Application Priority Data

May 5, 2019 (CN) .......................... 201910367798.6

(51) Int. Cl.
*G06V 20/52* (2022.01)
*G01S 19/48* (2010.01)
(Continued)

(52) U.S. Cl.
CPC ............. *G06V 20/52* (2022.01); *G01S 19/485* (2020.05); *G06T 7/20* (2013.01); *G06T 7/74* (2017.01); *G06V 20/54* (2022.01)

(58) Field of Classification Search
CPC ....... G01C 21/20; G01C 21/26; G01S 19/485; G06T 2207/30236; G06T 7/20;
(Continued)

(56) References Cited

U.S. PATENT DOCUMENTS 10,235,882 B1 * 3/2019 Aoude ................... G06N 20/10
2016/0012589 A1 * 1/2016 Hamer ................... H04N 23/90
348/148

(Continued)

FOREIGN PATENT DOCUMENTS

CN 101661617 A 3/2010
CN 102141398 A 8/2011
(Continued)

OTHER PUBLICATIONS

Tencent Technology, ISR, PCT/CN2020/084148, Jun. 30, 2020, 3 pgs.

(Continued)

*Primary Examiner* — Ruiping Li
(74) *Attorney, Agent, or Firm* — Morgan, Lewis & Bockius LLP

(57) ABSTRACT

This application provides a positioning method performed at a computer device. The method includes: obtaining an image photographed by an image capturing apparatus disposed at a roadside and a photographing orientation of the image; determining pixel coordinates in the image for a target object in the image; determining a relationship between the pixel coordinates corresponding to the photographing orientation and location coordinates in a physical world; and determining location coordinates of the target object in the physical world according to the relationship and the pixel coordinates. According to this application, location information of an object can be accurately determined according to a correspondence between pixel coordinates in an image and (Continued)

location coordinates in a physical world, and a transform relationship between pixel coordinates in different photographing orientations, and avoiding the problem that the target object cannot be positioned due to a blind area in a view field.

17 Claims, 7 Drawing Sheets

(51) Int. Cl.
  *G06T 7/20* (2017.01)
  *G06T 7/73* (2017.01)
  *G06V 20/54* (2022.01)

(58) Field of Classification Search
  CPC .. G06T 7/73; G06T 7/74; G06V 20/52; G06V 20/54; G08G 1/0116; G08G 1/0141; G08G 1/0175; G08G 1/04
  See application file for complete search history.

(56) References Cited

U.S. PATENT DOCUMENTS

| | | | |
|---|---|---|---|
| 2018/0151072 A1* | 5/2018 | Altinger | G08G 1/04 |
| 2018/0307238 A1 | 10/2018 | Wisniowski | |
| 2019/0012765 A1 | 1/2019 | Egri et al. | |

FOREIGN PATENT DOCUMENTS

| | | | |
|---|---|---|---|
| CN | 102306382 | A | 1/2012 |
| CN | 102496160 | A | 6/2012 |
| CN | 104933718 | A | 9/2015 |
| CN | 107798897 | A | 3/2018 |
| CN | 108364304 | A | 8/2018 |
| CN | 108416812 | A | 8/2018 |
| CN | 108759834 | A | 11/2018 |
| CN | 108830907 | A | 11/2018 |
| CN | 108980539 | A | 12/2018 |
| CN | 109003226 | A | 12/2018 |
| CN | 109118545 | A | 1/2019 |
| CN | 110174093 | A | 8/2019 |
| JP | 2003050107 | A | 2/2003 |
| JP | 4776329 | B2 | 9/2011 |

OTHER PUBLICATIONS

Tencent Technology, WO, PCT/CN2020/084148, Jun. 30, 2020, 5 pgs.
Tencent Technology, IPRP, PCT/CN2020/084148, Nov. 2, 2021, 6 pgs.
Extended European Search Report, EP20802454.7, Jun. 1, 2022, 11 pgs.
Tencent Technology, European Office Action, EP20802454.7, Nov. 2, 2023, 9 pgs.

* cited by examiner

POSITIONING METHOD, APPARATUS, DEVICE, AND COMPUTER-READABLE STORAGE MEDIUM

CROSS-REFERENCE TO RELATED APPLICATIONS

This application is a continuation application of PCT Patent Application No. PCT/CN2020/084148, entitled "POSITIONING METHOD, APPARATUS, AND DEVICE, AND COMPUTER-READABLE STORAGE MEDIUM" filed on Apr. 10, 2020, which claims priority to Chinese Patent Application No. 201910367798.6, filed with the State Intellectual Property Office of the People's Republic of China on May 5, 2019, and entitled "POSITIONING METHOD, APPARATUS, DEVICE, AND COMPUTER-READABLE STORAGE MEDIUM", all of which are incorporated herein by reference in their entirety.

FIELD OF THE TECHNOLOGY

Embodiments of this application relates to the field of computer vision technologies, and in particular, to a positioning method, apparatus, device, and a computer-readable storage medium.

BACKGROUND OF THE DISCLOSURE

In the assisted driving technology, in a case that a vehicle needs information of objects around a road for driving, visual perception is integrated into the vehicle for autonomous driving, and recognition, tracking, and positioning of a surrounding target are implemented by using a visual sensor on the vehicle, based on which the vehicle determines a driving route and a control mode thereof.

Autonomous driving generally adopts a multi-source fusion positioning technology, and main positioning fusion sources generally include: Real-Time Kinematic (RTK) positioning, Inertial Measurement Unit (IMU) positioning, lidar camera point cloud positioning, a high-precision map, and the like. Locations of the vehicle that travels autonomously and surrounding targets thereof may be obtained through the series of perception positioning sources and fusion technologies.

The sensors configured to perform positioning for a vehicle are all disposed on the vehicle, at relatively low positions with visual fields that are extremely apt to be shielded by a surrounding object (for example, a large truck), resulting in many blind areas.

SUMMARY

Embodiments of this application provide a positioning method, apparatus, device, and computer-readable storage medium, which can position, according to a photographed image, an object in the image.

According to a first aspect of an embodiment of this application, a positioning method is provided, the method being applicable to a computer device (e.g., a server), and the method including:
obtaining an image photographed by an image capturing apparatus and a photographing orientation of the image, the image capturing apparatus being disposed at a roadside;
determining pixel coordinates in the image for a target object in the image;
determining a relationship between the pixel coordinates corresponding to the photographing orientation and location coordinates in a physical world; and
determining location coordinates of the target object in the physical world according to the relationship and the pixel coordinates.

According to a second aspect of an embodiment of this application, a method for determining a coordinate relationship is provided, the coordinate relationship representing a relationship between pixel coordinates in an image and location coordinates in a physical world, the method being applicable to a server, and the method including:
determining location coordinates of a plurality of physical reference points that are located within a predetermined photographing range of an image capturing apparatus in the physical world;
obtaining a first image including the plurality of physical reference points and photographed by the image capturing apparatus in a first orientation;
determining, according to the location coordinates of each of the plurality of physical reference points in the physical world and pixel coordinates thereof in the first image, a correspondence between the pixel coordinates in the first image and the location coordinates in the physical world;
obtaining a second image including the plurality of physical reference points and photographed by the image capturing apparatus in a second orientation, the second orientation being different from the first orientation; and
determining, according to the pixel coordinates of each of the plurality of physical reference points in the first image and pixel coordinates thereof in the second image, a transform relationship between the pixel coordinates in the first image and the pixel coordinates in the second image.

According to an exemplary embodiment, the method further includes:
determining a relationship between pixel coordinates in an image photographed by the image capturing apparatus in the second orientation and location coordinates in the physical world according to the transform relationship and the correspondence.

According to a third aspect of an embodiment of this application, a positioning apparatus is provided, the apparatus being applicable to a server, and the apparatus including:
an obtaining unit, configured to obtain an image photographed by an image capturing apparatus and a photographing orientation of the image, the image capturing apparatus being disposed at a roadside;
a pixel coordinate determining unit, configured to determine pixel coordinates in the image for a target object in the image;
a correspondence determining unit, configured to determine a relationship between the pixel coordinates corresponding to the photographing orientation and location coordinates in a physical world; and
a location determining unit, configured to determine location coordinates of the target object in the physical world according to the relationship and the pixel coordinates.

According to a fourth aspect of an embodiment of this application, an apparatus for determining a coordinate relationship is provided, the coordinate relationship representing a relationship between pixel coordinates in an image and location coordinates in a physical world, the apparatus being disposed on a server, and the apparatus including:
- a first determining unit, configured to determine location coordinates of a plurality of physical reference points that are located within a predetermined photographing range of an image capturing apparatus in the physical world;
- a first obtaining unit, configured to obtain a first image including the plurality of physical reference points and photographed by the image capturing apparatus in a first orientation;
- a second determining unit, configured to determine, according to the location coordinates of each of the plurality of physical reference points in the physical world and pixel coordinates thereof in the first image, a correspondence between the pixel coordinates in the first image and the location coordinates in the physical world;
- a second obtaining unit, configured to obtain a second image including the plurality of physical reference points and photographed by the image capturing apparatus in a second orientation, the second orientation being different from the first orientation; and
- a third determining unit, configured to determine, according to the pixel coordinates of each of the plurality of physical reference points in the first image and pixel coordinates thereof in the second image, a transform relationship between the pixel coordinates in the first image and the pixel coordinates in the second image.

According to a fifth aspect of an embodiment of this application, a system for obtaining motion information of an object is provided, the system including:
- an image capturing apparatus, configured to photograph a predetermined site and a target object in the predetermined site in a top view orientation; and
- an edge-side server, configured to determine location coordinates of the target object in the physical world according to the positioning method in the first aspect according to the image photographed by the image capturing apparatus.

According to a sixth aspect of an embodiment of this application, a computer device is provided, the computer device including a processor and a memory, the memory storing a computer program, and the computer program, when executed by the processor, implementing any one of the method embodiments in the first and second aspects.

According to a seventh aspect of an embodiment of this application, a computer-readable storage medium is provided, storing a computer program, and the computer program, when executed by a processor, implementing any one of the method embodiments in the first and second aspects.

The technical solutions provided in the embodiments of this application may include the following beneficial effects:

In one or more embodiments of this application, a correspondence between pixel coordinates in a first image and location coordinates in an actual physical world is obtained according to the first image of a plurality of physical reference points and photographed by an image capturing apparatus in a specific first orientation (a predetermined orientation), and a transform relationship of pixel coordinates in two images is obtained according to pixel coordinates of the plurality of physical reference points in a second image photographed by the image capturing apparatus in another orientation and the pixel coordinates thereof in the first image, so that a server determines location coordinates of a target object in the physical world according to the pixel coordinates of the target object in the second image.

BRIEF DESCRIPTION OF THE DRAWINGS

The foregoing and other objectives, features, and advantages of this application will become more apparent from the detailed description of exemplary embodiments of this application with reference to the accompanying drawings. The accompanying drawings, which are incorporated in and constitute a part of the specification, illustrate embodiments consistent with this application and, together with the description, serve to explain the principles of this application.

DESCRIPTION OF EMBODIMENTS

In order to make the objects, technical solutions and advantages of this application clear, this application will be described in further detail below when taken in conjunction with the accompanying drawings and embodiments. It is to be understood that the embodiments described herein are for explanatory purposes only and are not intended to limit this application.

Figure 1:
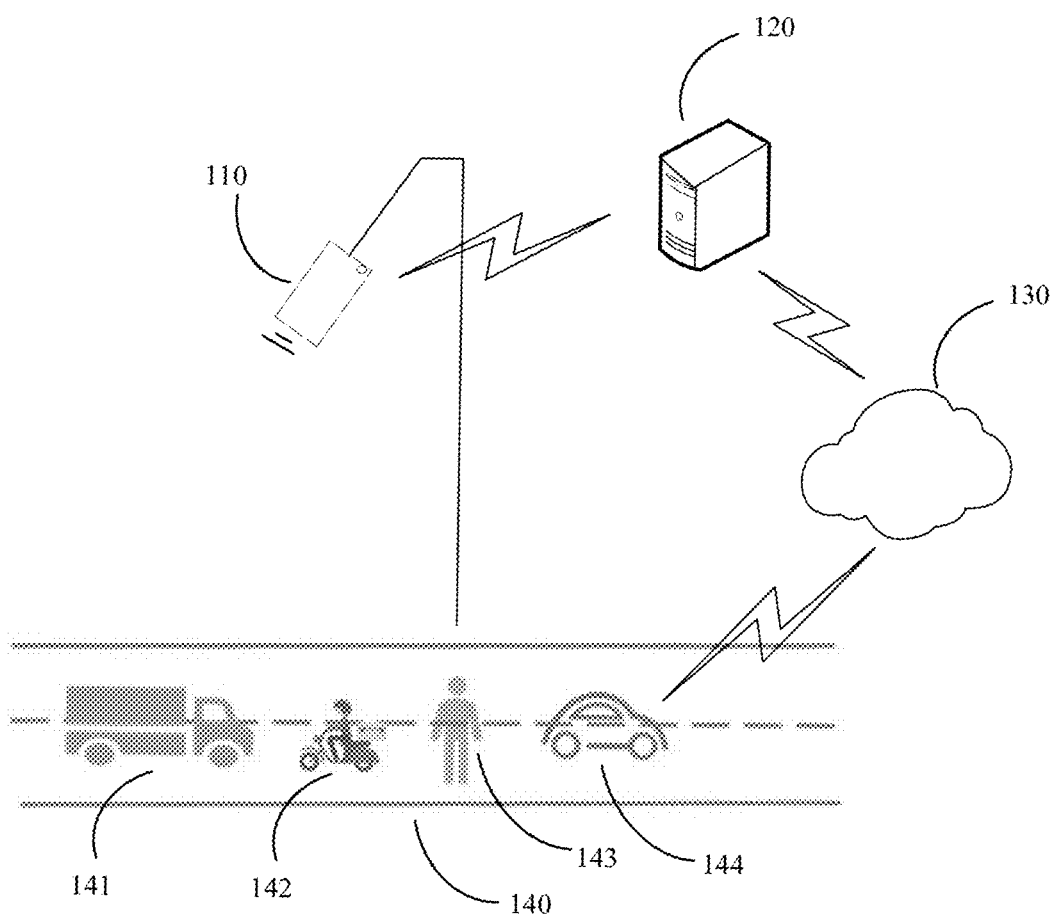
FIG. 1 is a schematic component block diagram of a system for obtaining motion information of an object according to an exemplary embodiment of this application.

FIG. 1 is a schematic component block diagram of a system 100 for obtaining motion information of an object according to an exemplary embodiment of this application. As shown in FIG. 1, the system 100 includes an image capturing apparatus 110 and an edge-side server 120. In FIG. 1, one image capturing apparatus 110 and one edge-side server 120 are shown as examples. It is to be understood that, in an alternative embodiment, the system 100 may include one or more image capturing apparatuses 110 and one or more edge-side servers 120, and each edge-side server 120 may serve one or more image capturing apparatuses 110.

The image capturing apparatus 110 is disposed on a side of a road 140 and configured to photograph the road 140 and one or more objects 141-144 on the road at a top view angle. For example, the image capturing apparatus 110 may be disposed at a predetermined height on an upright post located on a roadside and aligned with the road 140 at a top view angle. The image capturing apparatus 110 may be fixed, that is, a photographing orientation (a photographing angle and a distance to a road surface) is fixed, or may be movable, that is, the photographing orientation is adjustable (for example, the image capturing apparatus 110 may rotate the photographing angle and/or the distance to the road surface is adjustable). In an example, the image capturing apparatus 110 may be any apparatus capable of imaging an object, such as a camera, video camera, and lidar. The objects 141-144 may be moving objects or static objects, such as traveling or static vehicles, pedestrians, or guardrails on the road.

The edge-side server 120 may communicate with the image capturing apparatus 110 through a wired or wireless communication link, so that an image photographed by the image capturing apparatus 110 is transmitted to the edge-side server 120. The edge-side server 120 has an image recognition function, can recognize an object (for example, a vehicle, a pedestrian, or a guardrail) in an image, position, by using the positioning method provided in this embodiment of this application, the recognized object according to the image photographed by the image capturing apparatus 110, and obtain location coordinates of the object in a real physical world.

In some embodiments, in addition to being able to locate an object in an image, the edge-side server 120 may further determine at least one of a speed, a moving direction, and an acceleration of the object according to a plurality of corresponding location coordinates of the object determined based on a plurality of images including the object and photographed by the image capturing apparatus 110. For example, if location coordinates of an object A in a physical world is determined as i(i1, i2) based on pixel coordinates of the object A in an image i, and location coordinates of the object A in the physical world is determined as j(j1, j2) based on pixel coordinates of the object A in an image j, where the image i is photographed at a time t1 and the image j is photographed at a time t2 after t1, a moving speed V of the object A may be determined as: a result of dividing a distance between the coordinates i and the coordinates j by a difference between times at which the two images are photographed. In addition, a moving direction and an acceleration of the object A can also be calculated, which is not described in detail herein.

In some embodiments, the edge-side server 120 may further communicate with devices of vehicles on the road via a communication link of a network 130, to transmit determined motion information, such as a location, a speed, a moving direction, and an acceleration, of an object to the devices. In an example, a sufficient number of image capturing apparatuses 110 and corresponding edge-side servers 120 may be arranged on the roadside, so that a total range of the photographing ranges of all the image capturing apparatuses 110 can cover any place on the road. A vehicle on the road communicates with the corresponding edge-side server 120 during traveling, to obtain motion information of surrounding objects of the vehicle on the road, thereby realizing assisted driving/autonomous driving based on the information.

In an example, the network 130 is a mobile communication network. In an example, the edge-side server 120 may be an edge computing device or a component thereof of a mobile communication network, or may be a device capable of communicating with an edge computing device to transmit motion information of an object to the mobile communication network through the edge computing device, and then to a device of a vehicle or the like through the mobile communication network.

In the above description, the image capturing apparatus 110 is configured to photograph a road and an object on the road. It is to be understood that the image capturing apparatus 110 may be configured to photograph any predetermined site (which may be outdoor or indoor) and an object in the predetermined site in a top view orientation, and the road is merely an exemplary embodiment of the predetermined site.

It is to be understood that the edge-side server 120 as described above may be any computer device having the functions as described above, may be an independent device or a component of an independent device, or may be a generic term for a plurality of devices or components that are physically dispersed and are combined to achieve the functions as described above.

The system configured to obtain motion information of an object provided in this embodiment of this application may be a roadside sensing system based on vehicle-road coordination. Through the embodiments of the system, the problem that the V2X technology cannot work effectively in a case of low penetration rate can be resolved, and the vehicle-road coordination technology can be quickly implemented in practice. The system positions, through a visual positioning technology and by using an image photographed by an image capturing apparatus disposed on a roadside, an object in the image, to obtain information such as a location and a speed of the object, without mounting various sensors on a device needing such information, for example, a vehicle, thereby reducing costs of a sensing device and costs of autonomous driving/assisted driving, and providing relatively high-precision road condition sensed information at a relatively low cost. By the system, the positioning method, and the method for obtaining motion information provided in this embodiment of this application, various targets such as vehicles and pedestrians can be effectively recognized and positioned, to provide road condition information for a device of an assisted driving vehicle or the like. A roadside visual perception and positioning system of the image capturing apparatus is usually deployed at a height at the roadside, and therefore is not apt to be affected by a relatively high obstacle such as a large truck, thereby greatly reducing perception blind areas of an autonomous driving/assisted driving vehicle.

The embodiment described above is merely a description of an exemplary roadside sensing system according to an embodiment of this application, and there are various variations and changes to this embodiment.

Figure 2:
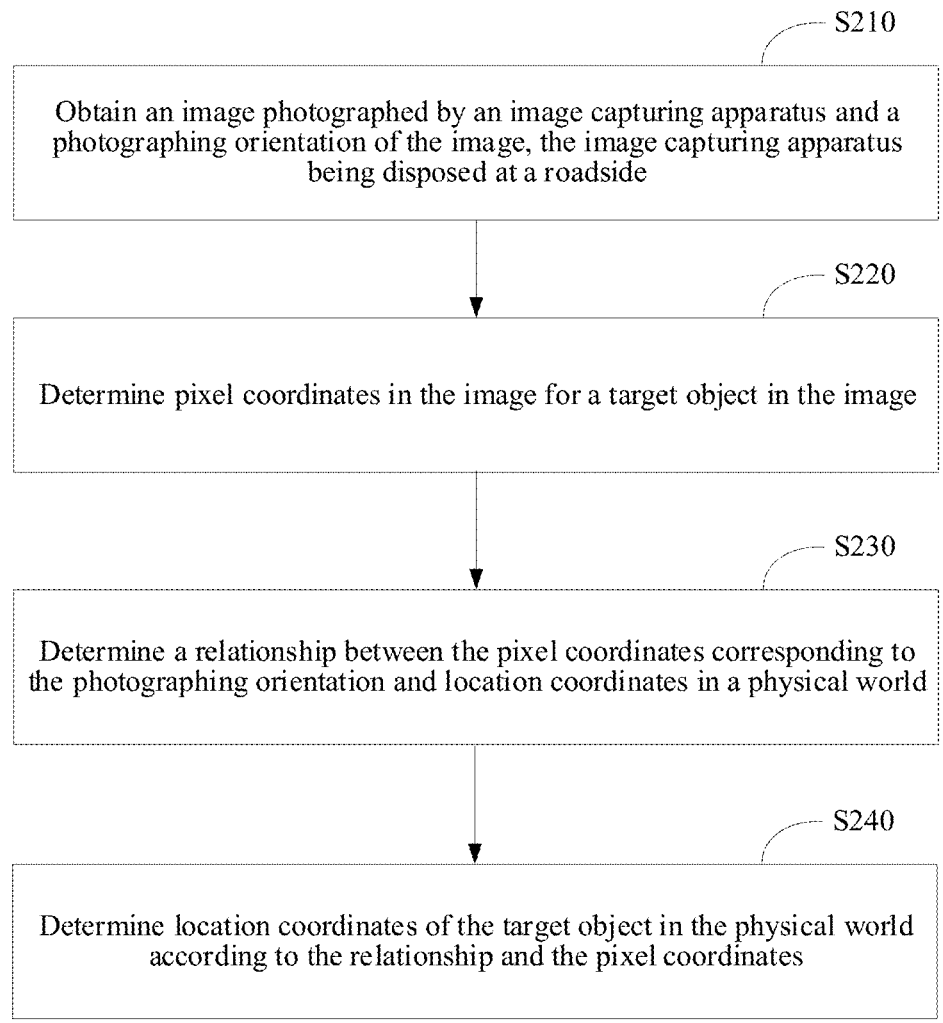
FIG. 2 is a schematic flowchart of a positioning method according to an exemplary embodiment of this application.

FIG. 2 is a schematic flowchart of a positioning method according to an exemplary embodiment of this application. The exemplary method may be performed by any computer device (for example, the edge-side server 120 shown in FIG. 1). The exemplary method includes the following steps:

S210. Obtain an image photographed by an image capturing apparatus and a photographing orientation of the image, the image capturing apparatus being disposed at a roadside.

The image capturing apparatus may be the image capturing apparatus 110 as described above. A computer device performing the exemplary method shown in FIG. 2 may communicate with the image capturing apparatus to obtain the image photographed by the image capturing apparatus.

The image capturing apparatus photographs an image in a specific orientation during image photographing, and images photographed in different photographing orientations (photographing angles and photographing distances) are different. The image capturing apparatus may save a corresponding photographing orientation when saving a photographed image. The computer device may obtain the corresponding photographing orientation when obtaining the image.

S220. Determine pixel coordinates in the image for a target object in the image.

The computer device may further recognize an object from the image by using a related image recognition technology. For example, the computer device recognizes a vehicle, a pedestrian, or the like from the image.

For the target object recognized from the image, the computer device may determine pixel coordinates of the target object in the image according to pixels corresponding to the target object in the image.

S230. Determine a relationship between the pixel coordinates corresponding to the photographing orientation and location coordinates in a physical world.

A calibration process of an image capturing apparatus refers to a process of determining a relationship between pixel coordinates in an image photographed by the image capturing apparatus and location coordinates in a physical world. The relationship is correlated to factors such as internal parameters and distortions of the image capturing apparatus, and also correlated to photographing orientations and location coordinates of the image capturing apparatus. Pixel coordinates in all images photographed by the same image capturing apparatus in a specific orientation have the same correspondence with location coordinates in the physical world, that is, the pixel coordinates in the images photographed by the same image capturing apparatus in the same photographing orientation have the same correspondence with the location coordinates in the physical world. In an embodiment, all possible photographing orientations of a target image capturing apparatus may be used for calculation and correspondences corresponding to the photographing orientations are saved. After obtaining an image and information of a photographing orientation, the correspondence may be applied to a target object recognized from the image. For how to determine a correspondence between pixel coordinates in an image photographed in an orientation and a location in the physical world, reference is made to the description of the embodiment shown in FIG. 5.

S240. Determine location coordinates of the target object in the physical world according to the relationship and the pixel coordinates.

If pixel coordinates of the target object in the image are obtained (S220) and the correspondence between the pixel coordinates that are in the image and correspond to the photographing orientation of the image and the location in the physical world is obtained (S230), the location coordinates in the physical world corresponding to the pixel coordinates, that is, an actual location of the target object, can be determined, thereby realizing positioning of the target object.

In an example, the computer device may further calculate at least one of the following parameters according to location coordinates corresponding to a plurality of images of the object photographed at different times: a moving speed, a moving direction, and an acceleration of the object. In an example, the computer device further transmits at least one of the location, the moving speed, the moving direction, and the acceleration of the object as motion information of the object to another device needing such information, for example, a related vehicle traveling on a road.

The location coordinates of the target object in the physical world in the foregoing embodiment may be Global Positioning System (GPS) coordinates, or plane location coordinates in a two-dimensional plane, and the two may be mutually converted as required. For example, GPS coordinates may be converted into plane location coordinates by Mercator projection or other conversion methods, and vice versa, plane location coordinates may be converted into GPS coordinates.

The positioning method provided in this embodiment of this application may be applied to a vehicle-road coordinated roadside visual perception scenario, a roadside visual perception system (for example, the system 100 shown in FIG. 1) provides, for a vehicle on a road, a location of another vehicle, pedestrian, obstacle, accident, sign, or the like on the road, and further calculates information such as a speed, a moving direction, and the like of a traffic participant on the road. The traffic participant (a vehicle, a pedestrian, or the like) on the road may determine, based on such information, which vehicles pose potential threats to safe driving of the traffic participant, so as to avoid danger without affecting the safe driving of other vehicles. In addition, the positioning method provided in this embodiment of this application may alternatively be applied to indoor positioning, which can position an indoor target, obtain location information of the indoor target, and provide information for indoor advertisement placement, route navigation, and the like.

In the positioning method (which may also be named as a visual positioning method) provided in this embodiment of this application, by determining pixel coordinates in an image and determining a correspondence between pixels that are in the image and correspond to a photographing orientation of the image and location coordinates in an actual physical world, location coordinates of an object in the image in the real world can be determined, thereby realizing positioning of the object.

As described above, to position the object in the image according to the image, it is necessary to calibrate the image capturing apparatus, that is, to determine the relationship between the pixel coordinates in the image photographed by the image capturing apparatus and the location coordinates in the physical world.

A method for calibrating camera internal parameters and distortion coefficients may be the Zhang's calibration method. However, to calibrate the relationship between the pixel coordinates in the image and the location coordinates in the physical world, correlation between a location of a physical reference point and a pixel of the reference point is needed, which is usually difficult to implement.

In an embodiment, the image capturing apparatus may be calibrated by using a dual camera calibration method. For example, in some scenarios, when two cameras have a relatively large overlapping coverage area, a dual-camera automatic calibration method may be used. In an overlapping coverage area of the two cameras, the two cameras recognize the same target at the same time, and the target corresponds one by one to the two cameras. Then, the location information of the target is calculated based on parameters such as internal parameters and a camera distance of the two cameras. Enough correspondences between pixels of physical reference points and actual physical locations needed for camera calibration are obtained when a plurality of targets are recognized.

In some embodiments, in a photographing orientation (hereinafter, referred to as a first orientation), there is an approximate linear transform relationship between pixel coordinates in the image photographed by the image capturing apparatus and location coordinates in the actual physical world, the linear transform relationship may be calculated according to the pixel coordinates in the image and a plurality of physical reference points of the location coordinates in the actual physical world. The image is an image in a given photographing orientation (hereinafter, referred to as a first image). The plurality of physical reference points (for example, four or more) are in the same plane. The photographing orientation may be a vertical photographing orientation. That is, the image capturing apparatus performs photographing perpendicular to a common plane where the selected plurality of physical reference points are located. The location coordinates in the actual physical world herein refer to coordinates in a plane coordinate system, which may be converted with GPS coordinates through Mercator projection or other conversion methods.

Figure 3:
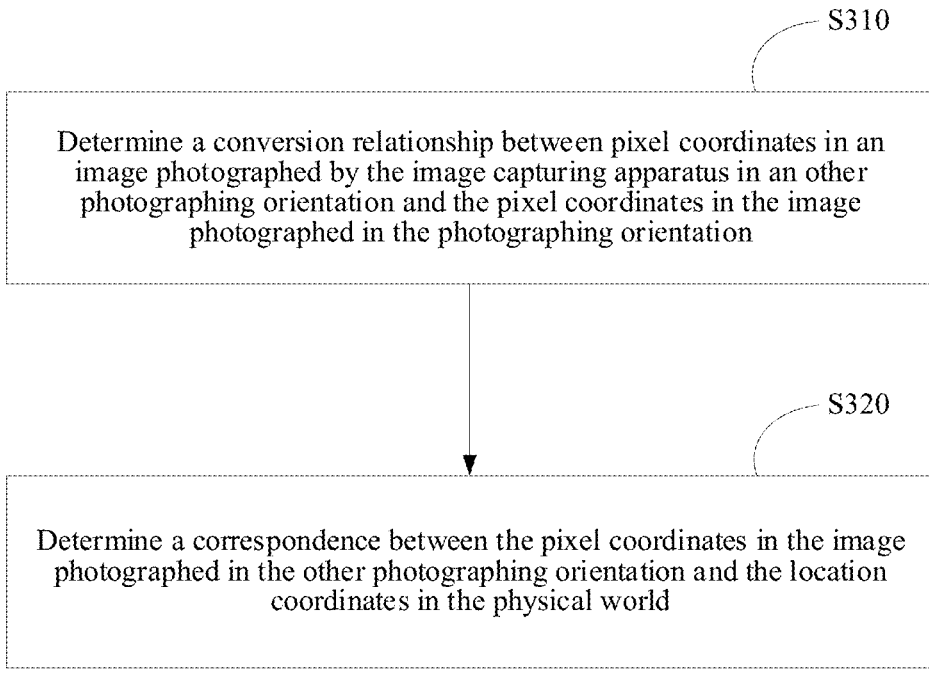
FIG. 3 is a schematic flowchart of a specific implementation of step S230 in FIG. 2 according to an exemplary embodiment of this application.

In some embodiments, for an image photographed by the image capturing apparatus in another photographing orientation (hereinafter, referred to as a second orientation) (hereinafter, referred to as a second image), the transform relationship between the pixel coordinates in the first image and the pixel coordinates in the second image, that is, the homography transform relationship, may be determined according to the corresponding pixel coordinates of the selected plurality of physical reference points in the first image and in the second image. The homography transform relationship may be expressed by homography conversion matrix. The relationship between the pixel coordinates in the second image and the location coordinates in the physical world may be determined according to the correspondence between the pixel coordinates in the first image and the location coordinates in the physical world and the transform relationship between the pixel coordinates in the first image and the second image. Therefore, the relationship between the pixel coordinates in the image photographed by the image capturing apparatus in the second orientation and the location coordinates in the physical world includes the following two relationships: 1. a correspondence between the pixel coordinates in the image in the first orientation and the location coordinates in the physical world; 2. a transform relationship between the pixel coordinates in the image in the first orientation and the image in the second orientation. Therefore, step S230 as described above may include the following two steps as shown in FIG. 3:

S310. Determine a transform relationship between pixel coordinates in an image photographed by the image capturing apparatus in another photographing orientation and the pixel coordinates in the image photographed in the photographing orientation.

The other photographing orientation herein may refer to the first orientation described above, for example, the vertical photographing orientation. The photographing orientation herein refers to the second orientation.

S320. Determine a correspondence between the pixel coordinates in the image photographed in the other photographing orientation and the location coordinates in the physical world.

Figure 4:
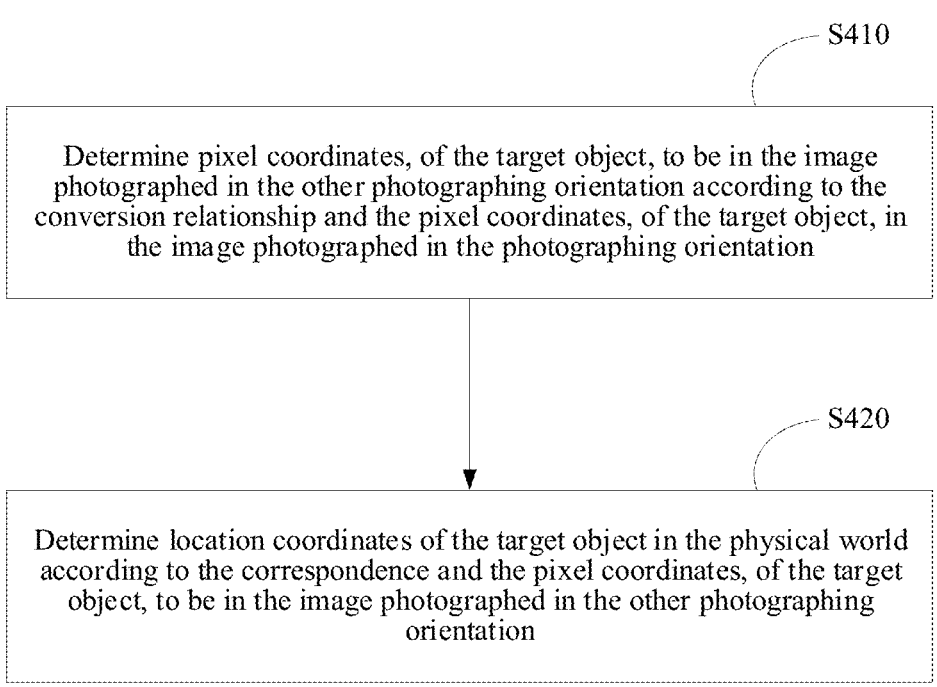
FIG. 4 is a schematic flowchart of a specific implementation of step S240 in FIG. 2 according to an exemplary embodiment of this application.

Based on the correspondence (the correspondence between the pixel coordinates in the image in the first orientation and location coordinates in the physical world) and the transform relationship, the relationship between the pixel coordinates in the image in the second orientation and the actual physical location coordinates may be determined first, and then S240 is performed, or positioning calculation may be directly performed in S240 according to the correspondence and the transform relationship. That is, S240 may include the following steps as shown in FIG. 4:

S410. Determine pixel coordinates, of the target object, to be in the image photographed in the other photographing orientation according to the transform relationship and the pixel coordinates, of the target object, in the image photographed in the photographing orientation.

In S410, if the target object is in the image photographed in the first orientation, pixel coordinates corresponding to the target object are determined, that is, conversion between the pixel coordinates in the image photographed in the first orientation and the image photographed in the second orientation is determined.

S420. Determine location coordinates of the target object in the physical world according to the correspondence and the pixel coordinates, of the target object, to be in the image photographed in the other photographing orientation.

In S420, the location coordinates in the physical world, that is, the coordinates in the plane coordinate system, are calculated according to the converted pixel coordinates. If GPS coordinates are needed, the coordinates in the plane coordinate system may be converted into the GPS coordinates.

Figure 5:
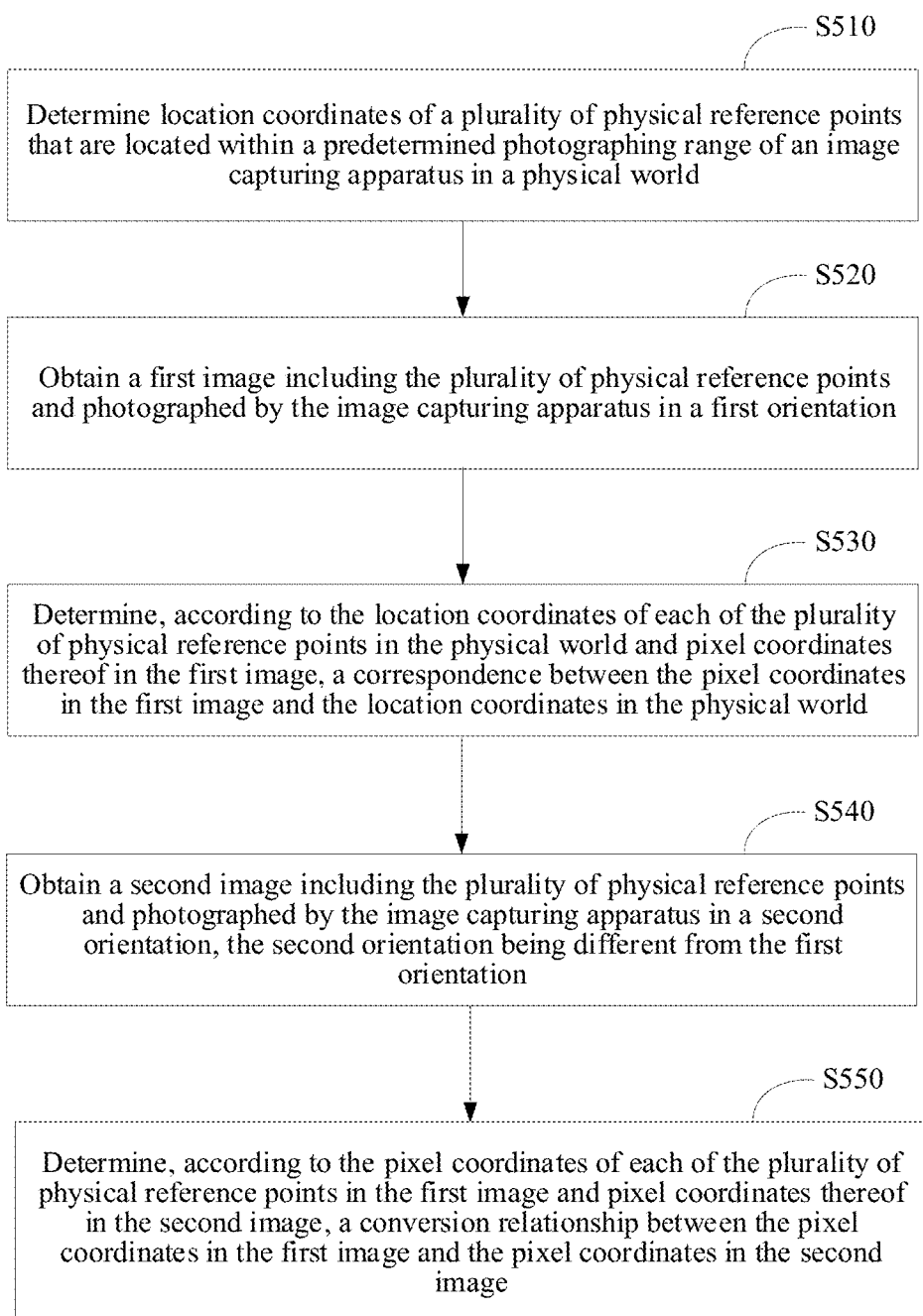
FIG. 5 is a schematic flowchart of a method for determining a coordinate relationship according to an exemplary embodiment of this application.

FIG. 5 is a flowchart of a method for determining a coordinate relationship provided in an exemplary embodiment of this application. The coordinate relationship represents a relationship between pixel coordinates in an image and location coordinates in a physical world. In the example shown in FIG. 5, the relationship is determined by using the method described above. FIG. 5 may be performed by any computer device (for example, the edge-side server 120 in FIG. 1). The exemplary method includes the following steps:

S510. Determine location coordinates of a plurality of physical reference points that are located within a predetermined photographing range of an image capturing apparatus in a physical world.

The predetermined photographing range refers to the photographing range of the image capturing apparatus in use. The photographing range herein refers to a range that can be photographed when the image capturing apparatus is fixed (that is, the photographing orientation is unchanged). That is, one photographing orientation corresponds to one photographing range. In some cases, a location and an angle of the image capturing apparatus are adjustable, so that the image capturing apparatus has a plurality of photographing ranges/photographing orientations, and calibration for each photographing range/photographing orientation is needed. As described above, to perform calibration, a plurality of physical reference points need to be used for calculating. The plurality of physical reference points are to be understood as two or more physical reference points, and generally four or more physical reference points are used. The plurality of physical reference points are substantially located in the same plane, and can be captured by the image capturing apparatus at the same time, that is, located in a corresponding photographing range in a photographing orientation of the image capturing apparatus. The plurality of physical reference points may be used to calibrate the corresponding photographing orientation/photographing range.

The location coordinates of the plurality of physical reference points in the physical world refer to plane coordinates of each physical reference point in a common plane thereof (hereinafter, referred to as a first plane). If GPS coordinates of the physical reference point are given, the GPS coordinates may be converted into the plane coordinates by Mercator projection or other conversion methods. On the contrary, if the plane coordinates of the physical reference point are given, GPS coordinates may be obtained.

In an embodiment, the location coordinates of each physical reference point in the actual physical world may be determined by using a high-precision positioning technique such as GPS positioning, radar positioning, or the like. For example, the GPS coordinates of each physical reference point may be determined first and then converted into plane location coordinates in the first plane. For another example, the plane location coordinates in the first plane can alternatively be directly obtained by using a high-precision positioning technique.

S520. Obtain a first image including the plurality of physical reference points and photographed by the image capturing apparatus in a first orientation.

The first orientation herein may be a vertical photographing orientation, in which the correspondence between pixel coordinates in the image and location coordinates in the physical world can be easily determined.

To recognize a physical reference point from the image, a recognizable object may be set at the physical reference point, and then photographed by the image capturing apparatus. The first image is not necessarily an image, but may be a first set of images including at least one image. Each image in the set may include a recognizable object corresponding to at least one of the plurality of physical reference points, and all the images in the first set of images together include recognizable objects corresponding to all the plurality of physical reference points. For example, assuming that the selected physical reference points are A, B, C, and D, the first image may include the following four images: an image 1 including a corresponding recognizable object of the physical reference point A, an image 2 including a corresponding recognizable object of the physical reference point B, an image 3 including a corresponding recognizable object of the physical reference point C, and an image 4 including a corresponding recognizable object of the physical reference point D. Or, the first image may alternatively be one image including corresponding recognizable objects of all the physical reference points. It is to be understood that the foregoing examples are exemplary only, and the first image may alternatively be a set of images including another quantity of images.

Although the first image may include a plurality of images, it is to be noted that the photographing orientations of the plurality of images are all the first orientation.

Figure 6:
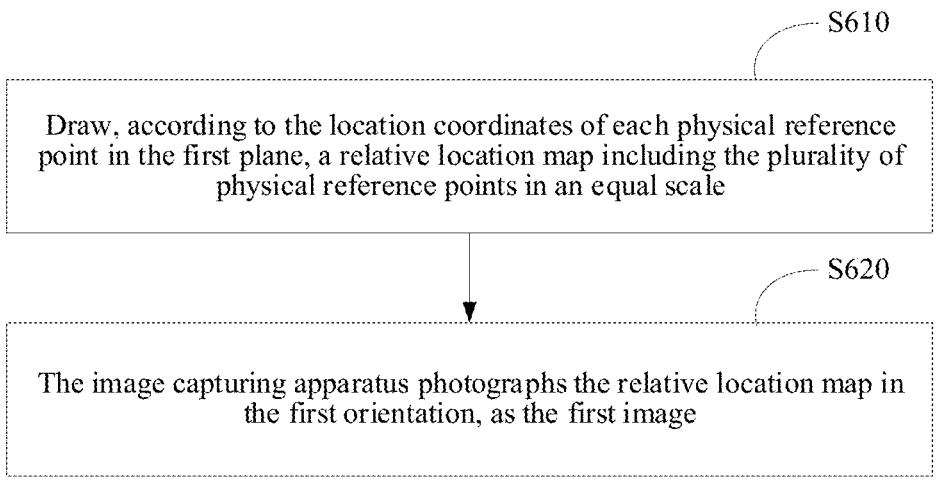
FIG. 6 is a schematic flowchart of a specific exemplary implementation of step S520 in FIG. 5 according to an exemplary embodiment of this application.

In an embodiment, the first image including the physical reference point may be an image photographed for a physical reference point in the actual physical world. In another embodiment, the first image may be an image of a relative location map of the plurality of physical reference points and photographed by the image capturing apparatus in the first orientation, the relative location map of the plurality of physical reference points being drawn in equal scale according to the location coordinates of each physical reference point in the first plane, and the first plane being a common plane determined by the plurality of physical reference points. FIG. 6 shows a schematic flowchart of obtaining a first image in such case. In this case, S520 may include the following steps:

S610. Draw, according to the location coordinates of each physical reference point in the first plane, a relative location map including the plurality of physical reference points in an equal scale.

Drawing in equal scale refers to that all distances between physical reference points in the drawn relative location map are in the same proportion as the corresponding real distances in the physical world.

S620. The image capturing apparatus photographs the relative location map in the first orientation, as the first image.

The relative location map is an equally scaled-down image (or an equally scaled-up image) of relative positions of the plurality of physical reference points, which is more convenient for photographing in the first orientation by the image capturing apparatus.

S530. Determine, according to the location coordinates of each of the plurality of physical reference points in the physical world and pixel coordinates thereof in the first image, a correspondence between the pixel coordinates in the first image and the location coordinates in the physical world.

After obtaining the first image, each physical reference point in the first image may be recognized and pixel coordinates of the physical reference point in the first image may be determined. The correspondence between the pixel coordinates in the first image and the location coordinates in the physical world may be obtained according to the pixel coordinates of each physical reference point in the first image and the location coordinates of the physical reference point in the physical world. The correspondence may be applicable to all images photographed by the same image capturing apparatus in the same first orientation. That is, the correspondence is the correspondence between the pixel coordinates in the image photographed by the image capturing apparatus in the first orientation and the location coordinates in the physical world.

S540. Obtain a second image including the plurality of physical reference points and photographed by the image capturing apparatus in a second orientation, the second orientation being different from the first orientation.

The second orientation refers to a photographing orientation to be calibrated, that is, the photographing orientation or one of the photographing orientations of the image capturing apparatus in use, which is generally different from the first orientation. For example, in the roadside visual perception system in which the image capturing apparatus 110 is fixedly disposed on an upright post on a roadside and photographs the road, the second orientation refers to an orientation in which the image capturing apparatus 110 photographs the road after being fixed to the upright post. If the image capturing apparatus 110 may have a plurality of photographing orientations, calibration may be performed one by one for each orientation.

To recognize a physical reference point from the image, a recognizable object may be set at the physical reference point, and then photographed in the second orientation by the image capturing apparatus. The second image is not necessarily an image, but may be a second set of images including one or more images. Each image in the set may include a recognizable objects corresponding to one or more of the plurality of physical reference points, and all the images in the second set of images together include recognizable objects corresponding to all the plurality of physical reference points.

S550. Determine, according to the pixel coordinates of each of the plurality of physical reference points in the first image and pixel coordinates thereof in the second image, a transform relationship between the pixel coordinates in the first image and the pixel coordinates in the second image.

From the obtained second image, the plurality of physical reference points may similarly be recognized and pixel coordinates of the physical reference points in the second image may be determined. There is a homography transform relationship between pixel coordinates in images photographed in different orientations by the same image capturing apparatus, which is expressed by a homography conversion matrix. From the pixel coordinates of each physical reference point in the first image and the pixel coordinates in the second image, a homography conversion matrix between the pixel coordinates in the first image and the second image may be determined. The homography conversion matrix is applicable to conversion between pixel coordinates in any image photographed in the first orientation and pixel coordinates in any image photographed in the second orientation by the image capturing apparatus. Therefore, the homography conversion matrix may be used as the transform relationship between the pixel coordinates in the image photographed by the image capturing apparatus in the first orientation and the pixel coordinates in the image photographed by the image capturing apparatus in the second orientation.

Through steps S510-S550, two relationships included in the relationship between the pixel coordinates in the image photographed by the image capturing apparatus in the second orientation (the orientation to be calibrated) and the location coordinates in the actual physical world may be obtained: the correspondence between the pixel coordinates in the image photographed by the image capturing apparatus in the first orientation and the location coordinates in the physical world; and the transform relationship between the pixel coordinates in the image photographed by the image capturing apparatus in the first orientation and the pixel coordinates in the image photographed by the image capturing apparatus in the second orientation. That is, the calibration of the second orientation of the image capturing apparatus is completed. In an embodiment, after obtaining the two relationships, the correspondence between the pixel coordinates in the image photographed by the image capturing apparatus in the second orientation and the location coordinates in the actual physical world can also be determined according to the two relationships, so as to be directly applied in the positioning method.

Although steps S510-S550 are shown in a sequential manner in FIG. 5, the calibration method according to an embodiment of this application is not limited to the sequence. S510-S550 may be executed in a different order from the order in FIG. 5. For example, one or more steps in S510-S550 may be executed in a reverse order, or may be executed simultaneously in parallel.

In an embodiment, the determining location coordinates of each physical reference point in the physical world (S510) and the obtaining a second image including the plurality of physical reference points and photographed by the image capturing apparatus in a second orientation (S540) may be implemented in the following exemplary implementations. The exemplary implementation may be performed by any computer device (for example, the edge-side server 120 shown in FIG. 1), and includes the following steps:

obtaining, for each physical reference point and in a case that the recognizable object is located at the physical reference point, location coordinates of the recognizable object in the physical world determined by a location sensing apparatus, as location coordinates of the physical reference point in the physical world; and obtaining, in a case that the recognizable object is located at the physical reference point, an image including the recognizable object and photographed by the image capturing apparatus in the second orientation, as an image in the second set of images.

In an embodiment of the implementation, the recognizable object is an object traveling through the physical reference point. A location sensing point of the location sensing apparatus is disposed at the physical reference point, and the location sensing apparatus is configured to: determine location coordinates of the location sensing point in the physical world and trigger photographing by the image capturing apparatus in the second orientation upon detection of the object passing through the location sensing point.

In an example, after the image capturing apparatus is set to the orientation to be calibrated, a radar synchronized with the image capturing apparatus is mounted, and when an object such as a vehicle passes through a radar irradiated point, an image is synchronously photographed immediately. If it is determined through image recognition that there is only one object passing by in such case, the object corresponds to one physical reference point. In this way, not only the location information of the object in the physical world can be obtained by the radar, but also the pixel location (pixel coordinates) of the object in the image (that is, the second image) can be obtained through image recognition. By adjusting an orientation angle of the radar to a plurality of different orientations, the location coordinates of a plurality of physical reference points in the physical world and the corresponding pixel coordinates in the second image can be obtained by using the foregoing method.

In another example, an object (for example, a special vehicle) may be provided with a marker easy to be recognized in an image, and equipped with a special high-precision positioning apparatus. After the image capturing apparatus is set to the orientation to be calibrated, the object is successively driven to a plurality of locations (physical reference points) within a predetermined photographing range of the image capturing apparatus and corresponding to the orientation to be calibrated, the image capturing apparatus respectively photographs an image (the second image) of the object at each location, and the location coordinates of each location (the physical reference point) in the physical world are respectively recorded on an object side.

In yet another example, some markers with fixed locations on the actual road (such as trees or traffic lights having a special characteristic on the roadside) may be used as corresponding markers of the physical reference points. The location coordinates of the markers in the physical world may be determined, and an image including the markers may be photographed as the second image.

Figure 7:
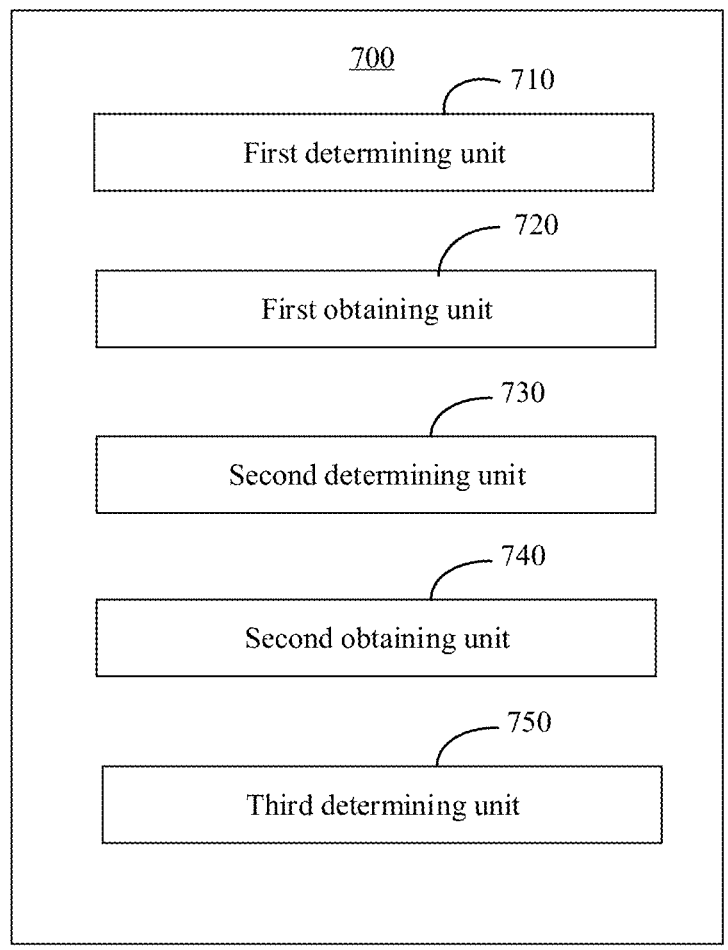
FIG. 7 is a schematic component block diagram of an apparatus for determining a coordinate relationship according to an exemplary embodiment of this application.

According to another aspect of this embodiment of this application, an apparatus for determining a coordinate relationship is further provided, the apparatus being configured to implement the embodiments of the calibration methods, the coordinate relationship representing a relationship between pixel coordinates in an image and location coordinates in a physical world. FIG. 7 is a schematic component block diagram of such an apparatus 700 according to an exemplary embodiment of this application. The apparatus 700 includes:

a first determining unit 710, configured to determine location coordinates of a plurality of physical reference points that are located within a predetermined photographing range of an image capturing apparatus in a physical world;

a first obtaining unit 720, configured to obtain a first image including the plurality of physical reference points and photographed by the image capturing apparatus in a first orientation, the first orientation being a vertical photographing orientation;

a second determining unit 730, configured to determine, according to the location coordinates of each of the plurality of physical reference points in the physical world and pixel coordinates thereof in the first image, a correspondence between the pixel coordinates in the first image and the location coordinates in the physical world;

a second obtaining unit 740, configured to obtain a second image including the plurality of physical reference points and photographed by the image capturing apparatus in a second orientation, the second orientation being different from the first orientation; and a third determining unit 750, configured to determine, according to the pixel coordinates of each of the plurality of physical reference points in the first image and pixel coordinates thereof in the second image, a transform relationship between the pixel coordinates in the first image and the pixel coordinates in the second image.

In an exemplary embodiment, the photographing orientation includes a second orientation, the second orientation being different from the first orientation.

The second obtaining unit 740 is configured to obtain a second image including the plurality of physical reference points and photographed by the image capturing apparatus in the second orientation.

The third determining unit 750 is configured to determine, according to the pixel coordinates of each of the plurality of physical reference points in the first image and pixel coordinates thereof in the second image, a transform relationship between the pixel coordinates in the first image and the pixel coordinates in the second image.

The third determining unit 750 is configured to determine, according to the correspondence between the pixel coordinates in the first image and the location coordinates in the physical world and the transform relationship, a correspondence between the pixel coordinates in the second image and the location coordinates in the physical world.

In an exemplary embodiment, the apparatus 700 may further include:

a fourth determining unit, configured to determine a relationship between the pixel coordinates in the second image and the location coordinates in the physical world according to the transform relationship and the correspondence.

In an exemplary embodiment, the location coordinates in the physical world are location coordinates in a first plane, and the first plane is a common plane determined by the plurality of physical reference points.

In an exemplary embodiment, the first image is a relative location map of the plurality of physical reference points and photographed by the image capturing apparatus in the first orientation, the relative location map of the plurality of physical reference points being drawn in equal scale according to the location coordinates of all the physical reference points in a first plane, and the first plane being a common plane determined by the plurality of physical reference points.

In an exemplary embodiment, the first plane includes the plurality of physical reference points.

The first determining unit 710 is configured to determine GPS coordinates of each of the plurality of physical reference points; and determine, according to the GPS coordinates of each physical reference point, location coordinates of the physical reference point in the first plane.

In an exemplary embodiment, in the first image and the second image, there are recognizable objects at the plurality of physical reference points, the first image is a first set of images including at least one image, the second image is a second set of images including at least one image, each image in the first set of images includes a recognizable object corresponding to at least one of the plurality of physical reference points, all the images in the first set of images together include the recognizable objects corresponding to all the plurality of physical reference points, each image in the second set of images includes a recognizable object corresponding to at least one of the plurality of physical reference points, and all the images in the second set of images together include the recognizable objects corresponding to all the plurality of physical reference points.

In an exemplary embodiment, the first obtaining unit 720 is configured to obtain, for each physical reference point and in a case that the recognizable object is located at the physical reference point, location coordinates of the recognizable object in the physical world determined by a location sensing apparatus, as location coordinates of the physical reference point in the physical world.

The second obtaining unit 740 is configured to obtain, in a case that the recognizable object is located at the physical reference point, an image including the recognizable object and photographed by the image capturing apparatus in the second orientation, as an image in the second set of images.

Figure 8:
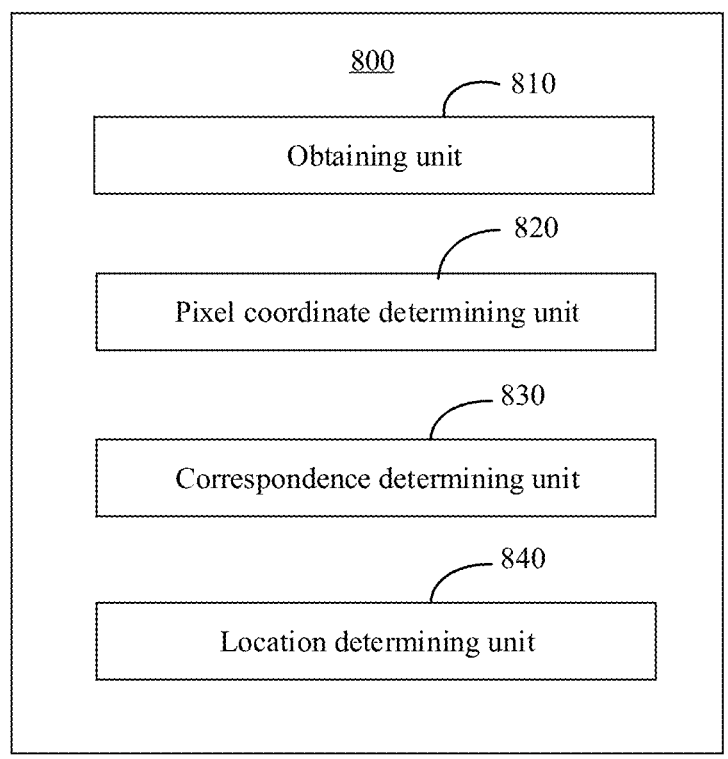
FIG. 8 is a schematic component block diagram of a positioning apparatus according to an exemplary embodiment of this application.

According to yet another aspect of the embodiments of this application, a positioning apparatus is further provided, for performing various positioning method embodiments as described above. FIG. 8 is a schematic component block diagram of a positioning apparatus 800 according to an exemplary embodiment of this application. The apparatus 800 includes:

an obtaining unit 810, configured to obtain an image photographed by an image capturing apparatus and a photographing orientation of the image, the image capturing apparatus being disposed on a roadside, the photographing orientation including at least one of a first orientation and a second orientation, the first orientation being a vertical orientation, and the second orientation being different from the first orientation;

a pixel coordinate determining unit 820, configured to determine pixel coordinates in the image for a target object in the image;

a correspondence determining unit 830, configured to determine a relationship between the pixel coordinates corresponding to the photographing orientation and location coordinates in the physical world; and a location determining unit 840, configured to determine location coordinates of the target object in the physical world according to the relationship and the pixel coordinates.

It is to be understood that the correspondence determining unit 830 may be embodied as any embodiment of the apparatus 700 as described previously.

In an exemplary embodiment, the pixel coordinate determining unit 820 is configured to determine corresponding location coordinates of the target object in the physical world according to the plurality of images including the target object; and determine motion information of the target object according to the location coordinates, the motion information including at least one of the following information:

a speed;

a moving direction; and an acceleration.

The implementation and related details of the functions and effects of the various units/modules in the above-described apparatus are described in detail in the implementation of the corresponding steps in the above-described method embodiment and will not be described in detail herein. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

The apparatus embodiments in the foregoing embodiments may be implemented by using hardware, software, firmware, or a combination thereof, and may be implemented as an independent apparatus, or may be implemented as a logical integrated system in which composition units/modules are dispersed in one or more computing devices and respectively execute corresponding functions. The units/modules constituting the apparatus in the foregoing embodiments are divided according to logical functions, and may be re-divided according to logical functions. For example, the apparatus may be implemented by using more or fewer units/modules. The composition units/modules may be separately implemented by using hardware, software, firmware, or a combination thereof. The composition units/modules may be independent components, or may be an integrated unit/module of which a plurality of components are combined to perform a corresponding logical function. The hardware, software, firmware, or a combination thereof may include: a separate hardware component, a function module implemented in a programming manner, a function module implemented through a programmable logic device, or the like, or a combination thereof.

According to an exemplary embodiment, each of the apparatus embodiments may be implemented as a computing device, the computing device includes a memory and a processor, the memory stores a computer program, and the computer program, when executed by the processor, causes the computing device to perform any one of the embodiments of the foregoing positioning method or calibrating method, or the computer program, when executed by the processor, causes the computing device to implement the functions implemented by the composition units/modules of the foregoing apparatus embodiments.

The processor described in the foregoing embodiment may be a single processing unit such as a central processing unit (CPU), or may be a distributed processor system including a plurality of distributed processing units/processors.

The memory in the foregoing embodiment may include one or more memories, which may be internal memories of a computing device, for example, various transient or non-transient memories, or may be an external storage apparatus connected to the computing device through a memory interface.

Figure 9:
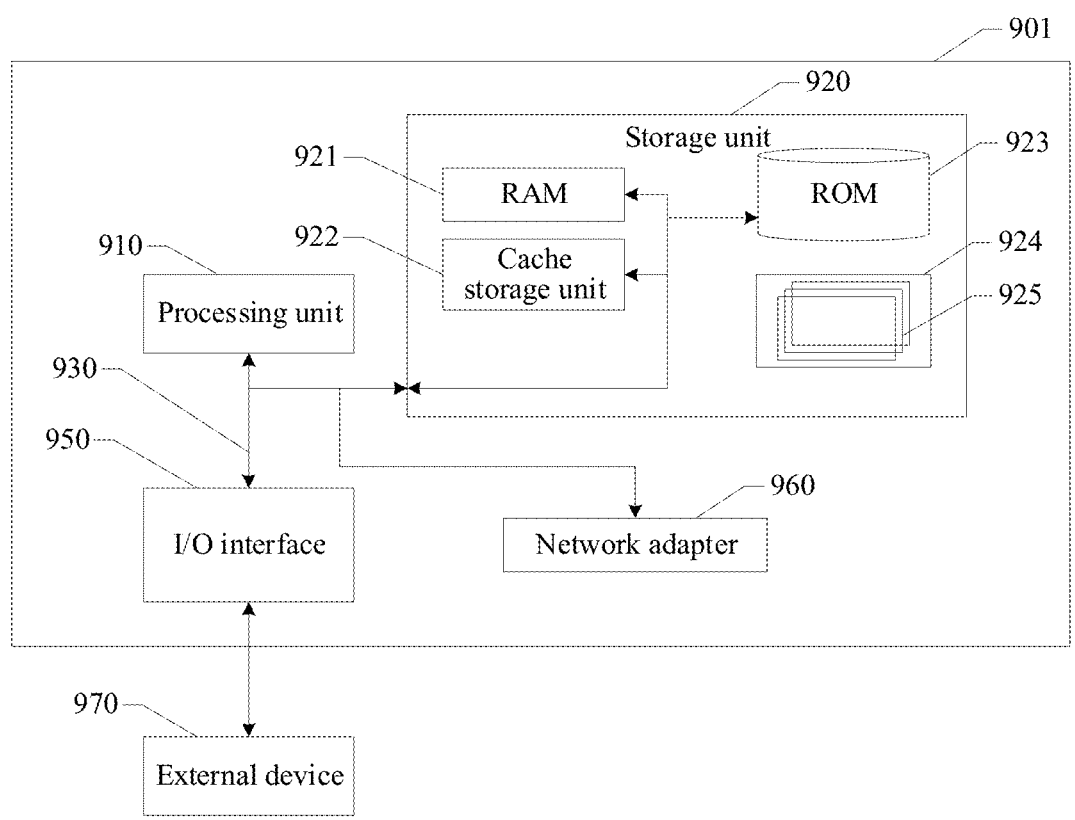
FIG. 9 is a schematic component block diagram of a computing device according to an exemplary embodiment of this application.

FIG. 9 is a schematic block diagram of components of an exemplary embodiment of such a computing device 901. As shown in FIG. 9, the computing device may include, but is not limited to: at least one processing unit 910, at least one storage unit 920, and a bus 930 connecting different system components (including the storage unit 920 and the processing unit 910).

The storage unit stores program code. The program code, when executed by the processing unit 910, may cause the processing unit 910 to perform the steps according to the exemplary implementations of this application described in the exemplary methods in this specification. For example, the processing unit 910 may perform the steps shown in FIG. 9.

The storage unit 920 may include a readable medium in the form of a volatile storage unit, for example, a random access memory (RAM) 921 and/or a cache storage unit 922, and may further include a read-only memory (ROM) 923.

The storage unit 920 may further include a program/utility 924 having a set of (at least one) program modules 925. Such program modules 925 include, but are not limited to, an operating system, one or more applications, other program modules, and program data. Each of such examples or a combination thereof may include an implementation of a network environment.

The bus 930 may indicate one or more of several types of bus structures, including a memory cell bus or memory cell controller, a peripheral bus, a graphics acceleration port, a processing unit, or a local bus using any of the plurality of bus structures.

The computing device may alternatively communicate with one or more external devices 970 (such as a keyboard, a pointing device, and a Bluetooth device), may alternatively communicate with one or more devices that enable a user to interact with the computing device, and/or communicate with any device (such as router or a modem) that enables the computing device to communicate with one or more other computing devices. Such communication may be performed by using an input/output (I/O) interface 950. In an embodiment, the computing device may further communicate with one or more networks (for example, a local area network (LAN), a wide area network (WAN), and/or a public network such as the Internet) by using a network adapter 960. As shown in FIG. 9, the network adapter 960 communicates with other modules through the bus 930 and the computing device. Although not shown in the figure, the computing device may be implemented by using other hardware and/or software modules, including but not limited to: microcode, a device drive, a redundancy processing unit, an external magnetic disk drive array, a RAID system, a tape drive, a data backup storage system, and the like.

According to the foregoing descriptions of the implementations, a person skilled in the art may readily understand that the exemplary implementations described herein may be implemented by using software, or may be implemented by combining software and necessary hardware. Therefore, the technical solutions of the implementations of this application may be implemented in the form of a software product. The software product may be stored in a non-volatile storage medium (which may be a CD-ROM, a USB flash drive, a removable hard disk, or the like) or in a network and includes several instructions for instructing a computing device (which may be a personal computer, a server, a terminal apparatus, a network device, or the like) to perform the methods described in the implementations of this application.

In an exemplary embodiment of this application, a computer-readable storage medium is further provided, storing computer program, and the computer program, when executed by a processor of a computer, causing the computer to perform the method embodiments described in the foregoing method embodiments.

According to an embodiment of this application, a program product for performing the method in the foregoing method embodiments is further provided. The program product may use a portable CD-ROM and include program code, and may be run on a terminal device such as a personal computer. However, the program product in this embodiment of this application is not limited thereto. In this specification, the readable storage medium may be any tangible medium containing or storing a program, and the program may be used by or used in combination with an instruction execution system, an apparatus, or a device.

The program product may adopt any combination of one or more readable media. The readable medium may be a readable signal medium or a readable storage medium. The readable storage medium may be, for example, but not limited to, an electrical, magnetic, optical, electromagnetic, infrared, or semiconductor system, apparatus, or device, or any combination of the foregoing. More specific examples (non-exhaustive list) of the readable storage medium include: electrical connections with one or more wires, portable disks, hard disks, random access memory (RAM), read only memory (ROM), erasable programmable read-only memory (EPROM) or flash memory, optical fibers, CD-ROMs, optical storage devices, magnetic storage devices, or any suitable combination thereof.

The computer-readable signal medium may include a data signal being in a baseband or propagated as a part of a carrier, the data signal carrying computer-readable program. Such propagated data signals may take a variety of forms, including but not limited to, electromagnetic signals, optical signals, or any suitable combination thereof. The readable signal medium may also be any readable medium other than a readable storage medium that may transmit, propagate, or transmit programs for use by or in conjunction with the instruction execution system, apparatus, or device.

The computer program included in the readable medium may be transmitted by using any appropriate medium, including but not limited to: a wireless medium, a wired medium, an optical cable, radio frequency (RF), any appropriate combination thereof, or the like.

The program code used for executing the operations the embodiments of this application may be written by using one or more programming languages or a combination thereof. The programming languages include an object-oriented programming language such as Java, C++ and the like, and also include a conventional procedural programming language such as "C" or similar programming languages. The program code may be executed entirely on the user computing device, partially on the user equipment, as an independent software package, partially on the user computing device and partially on the remote computing device, or entirely on the remote computing device or server. In a case involving a remote computing device, the remote computing device may be connected to a user computing device through any type of networks, including a local area network (LAN) or a wide area network (WAN), or may be connected to an external computing device (for example, connected through the Internet provided by an Internet service provider).

The various technical features of the foregoing embodiments may be arbitrarily combined, and all possible combinations of the various technical features of the above embodiments have not been described for the sake of simplicity of the description. However, as long as there is no contradiction between the combinations of these technical features, it is considered as the scope described in this specification.

The foregoing is only an illustrative embodiment of this application, and is not intended to limit this application. Any modification, equivalent substitution, improvement made within the spirit and principle of this application is included within the scope of protection of this application.

What is claimed is:

1. A positioning method, applicable to a computer device, the method comprising:
   obtaining an image photographed by an image capturing apparatus and a photographing orientation of the image, wherein the photographing orientation comprises a first orientation, the image capturing apparatus being disposed at a roadside;
   determining pixel coordinates in the image for a target object in the image;
   determining a relationship between the pixel coordinates corresponding to the photographing orientation and location coordinates in a physical world, further including:
      determining location coordinates of a plurality of physical reference points that are located within a predetermined photographing range of the image capturing apparatus in the physical world, wherein the location coordinates in the physical world are location coordinates in a first plane, the first plane being a common plane determined by the plurality of physical reference points;
      obtaining a first image comprising the plurality of physical reference points and photographed by the image capturing apparatus in the first orientation;
      determining, according to the location coordinates of each of the plurality of physical reference points in the physical world and pixel coordinates thereof in the first image, a correspondence between the pixel coordinates in the first image and the location coordinates in the physical world as the relationship;
      obtaining a second image comprising the plurality of physical reference points and photographed by the image capturing apparatus in a second orientation that is different from the first orientation;
      determining, according to the pixel coordinates of each of the plurality of physical reference points in the first image and pixel coordinates thereof in the second image, a transform relationship between the pixel coordinates in the first image and the pixel coordinates in the second image; and
      determining, according to the correspondence between the pixel coordinates in the first image and the location coordinates in the physical world and the transform relationship, a correspondence between the pixel coordinates in the second image and the location coordinates in the physical world; and
      determining location coordinates of the target object in the physical world according to the relationship and the pixel coordinates.

2. The method according to claim 1, wherein the first image is a relative location map of the plurality of physical reference points and photographed by the image capturing apparatus in the first orientation, the relative location map of the plurality of physical reference points being drawn in equal scale according to the location coordinates of all the physical reference points in a first plane, and the first plane being a common plane determined by the plurality of physical reference points.

3. The method according to claim 1, wherein the first plane comprises the plurality of physical reference points; and
   the determining location coordinates of a plurality of physical reference points that are located within a predetermined photographing range of the image capturing apparatus in the physical world comprises:
determining Global Positioning System (GPS) coordinates of each of the plurality of physical reference points; and
determining, according to the GPS coordinates of each physical reference point, location coordinates of the physical reference point in the first plane.

4. The method according to claim 1, wherein in the first image and the second image, there are recognizable objects at the plurality of physical reference points, the first image is a first set of images comprising at least one image, the second image is a second set of images comprising at least one image, each image in the first set of images comprises the recognizable object corresponding to at least one of the plurality of physical reference points, all the images in the first set of images together comprise the recognizable objects corresponding to all the plurality of physical reference points, each image in the second set of images comprises the recognizable object corresponding to at least one of the plurality of physical reference points, and all the images in the second set of images together comprise the recognizable objects corresponding to all the plurality of physical reference points.

5. The method according to claim 4, wherein the determining location coordinates of a plurality of physical reference points that are located within a predetermined photographing range of the image capturing apparatus in the physical world comprises:
obtaining, for each physical reference point and in a case that the recognizable object is located at the physical reference point, location coordinates of the recognizable object in the physical world determined by a location sensing apparatus, as location coordinates of the physical reference point in the physical world; and
the obtaining a second image comprising the plurality of physical reference points and photographed by the image capturing apparatus in the second orientation comprises:
obtaining, in a case that the recognizable object is located at the physical reference point, an image comprising the recognizable object and photographed by the image capturing apparatus in the second orientation, as an image in the second set of images.

6. The method according to claim 1, wherein the method further comprises:
determining corresponding location coordinates of the target object in the physical world according to a plurality of images comprising the target object; and
determining motion information of the target object according to the location coordinates, the motion information comprising at least one of the following information:
a speed;
a moving direction; and
an acceleration.

7. A computer device, comprising a processor and a memory, the memory storing a plurality of computer programs, and the computer programs, when executed by the processor, causing the computer device to perform a plurality of operations including:
obtaining an image photographed by an image capturing apparatus and a photographing orientation of the image, wherein the photographing orientation comprises a first orientation, the image capturing apparatus being disposed at a roadside;
determining pixel coordinates in the image for a target object in the image;
determining a relationship between the pixel coordinates corresponding to the photographing orientation and location coordinates in a physical world, further including:
determining location coordinates of a plurality of physical reference points that are located within a predetermined photographing range of the image capturing apparatus in the physical world, wherein the location coordinates in the physical world are location coordinates in a first plane, the first plane being a common plane determined by the plurality of physical reference points;
obtaining a first image comprising the plurality of physical reference points and photographed by the image capturing apparatus in the first orientation;
determining, according to the location coordinates of each of the plurality of physical reference points in the physical world and pixel coordinates thereof in the first image, a correspondence between the pixel coordinates in the first image and the location coordinates in the physical world as the relationship;
obtaining a second image comprising the plurality of physical reference points and photographed by the image capturing apparatus in a second orientation that is different from the first orientation;
determining, according to the pixel coordinates of each of the plurality of physical reference points in the first image and pixel coordinates thereof in the second image, a transform relationship between the pixel coordinates in the first image and the pixel coordinates in the second image; and
determining, according to the correspondence between the pixel coordinates in the first image and the location coordinates in the physical world and the transform relationship, a correspondence between the pixel coordinates in the second image and the location coordinates in the physical world; and
determining location coordinates of the target object in the physical world according to the relationship and the pixel coordinates.

8. The computer device according to claim 7, wherein the first image is a relative location map of the plurality of physical reference points and photographed by the image capturing apparatus in the first orientation, the relative location map of the plurality of physical reference points being drawn in equal scale according to the location coordinates of all the physical reference points in a first plane, and the first plane being a common plane determined by the plurality of physical reference points.

9. The computer device according to claim 7, wherein the first plane comprises the plurality of physical reference points; and
the determining location coordinates of a plurality of physical reference points that are located within a predetermined photographing range of the image capturing apparatus in the physical world comprises:
determining Global Positioning System (GPS) coordinates of each of the plurality of physical reference points; and
determining, according to the GPS coordinates of each physical reference point, location coordinates of the physical reference point in the first plane.

10. The computer device according to claim 7, wherein in the first image and the second image, there are recognizable objects at the plurality of physical reference points, the first image is a first set of images comprising at least one image, the second image is a second set of images comprising at least one image, each image in the first set of images comprises the recognizable object corresponding to at least one of the plurality of physical reference points, all the images in the first set of images together comprise the recognizable objects corresponding to all the plurality of physical reference points, each image in the second set of images comprises the recognizable object corresponding to at least one of the plurality of physical reference points, and all the images in the second set of images together comprise the recognizable objects corresponding to all the plurality of physical reference points.

11. The computer device according to claim 10, wherein the determining location coordinates of a plurality of physical reference points that are located within a predetermined photographing range of the image capturing apparatus in the physical world comprises:
  obtaining, for each physical reference point and in a case that the recognizable object is located at the physical reference point, location coordinates of the recognizable object in the physical world determined by a location sensing apparatus, as location coordinates of the physical reference point in the physical world; and
  the obtaining a second image comprising the plurality of physical reference points and photographed by the image capturing apparatus in the second orientation comprises:
    obtaining, in a case that the recognizable object is located at the physical reference point, an image comprising the recognizable object and photographed by the image capturing apparatus in the second orientation, as an image in the second set of images.

12. The computer device according to claim 7, wherein the plurality of operations further comprise:
  determining corresponding location coordinates of the target object in the physical world according to a plurality of images comprising the target object; and
  determining motion information of the target object according to the location coordinates, the motion information comprising at least one of the following information:
    a speed;
    a moving direction; and
    an acceleration.

13. A non-transitory computer-readable storage medium, storing a plurality of computer programs, and the computer programs, when executed by a processor of a computer device, causing the computer device to perform a plurality of operations including:
  obtaining an image photographed by an image capturing apparatus and a photographing orientation of the image, wherein the photographing orientation comprises a first orientation, the image capturing apparatus being disposed at a roadside;
  determining pixel coordinates in the image for a target object in the image;
  determining a relationship between the pixel coordinates corresponding to the photographing orientation and location coordinates in a physical world, further including:
    determining location coordinates of a plurality of physical reference points that are located within a predetermined photographing range of the image capturing apparatus in the physical world, wherein the location coordinates in the physical world are location coordinates in a first plane, the first plane being a common plane determined by the plurality of physical reference points;
    obtaining a first image comprising the plurality of physical reference points and photographed by the image capturing apparatus in the first orientation;
    determining, according to the location coordinates of each of the plurality of physical reference points in the physical world and pixel coordinates thereof in the first image, a correspondence between the pixel coordinates in the first image and the location coordinates in the physical world as the relationship;
    obtaining a second image comprising the plurality of physical reference points and photographed by the image capturing apparatus in a second orientation that is different from the first orientation;
    determining, according to the pixel coordinates of each of the plurality of physical reference points in the first image and pixel coordinates thereof in the second image, a transform relationship between the pixel coordinates in the first image and the pixel coordinates in the second image; and
    determining, according to the correspondence between the pixel coordinates in the first image and the location coordinates in the physical world and the transform relationship, a correspondence between the pixel coordinates in the second image and the location coordinates in the physical world; and
  determining location coordinates of the target object in the physical world according to the relationship and the pixel coordinates.

14. The non-transitory computer-readable storage medium according to claim 13, wherein the plurality of operations further comprise:
  determining corresponding location coordinates of the target object in the physical world according to a plurality of images comprising the target object; and
  determining motion information of the target object according to the location coordinates, the motion information comprising at least one of the following information:
    a speed;
    a moving direction; and
    an acceleration.

15. The non-transitory computer-readable storage medium according to claim 13, wherein the first image is a relative location map of the plurality of physical reference points and photographed by the image capturing apparatus in the first orientation, the relative location map of the plurality of physical reference points being drawn in equal scale according to the location coordinates of all the physical reference points in a first plane, and the first plane being a common plane determined by the plurality of physical reference points.

16. The non-transitory computer-readable storage medium according to claim 13, wherein the first plane comprises the plurality of physical reference points; and
  the determining location coordinates of a plurality of physical reference points that are located within a predetermined photographing range of the image capturing apparatus in the physical world comprises:
    determining Global Positioning System (GPS) coordinates of each of the plurality of physical reference points; and
    determining, according to the GPS coordinates of each physical reference point, location coordinates of the physical reference point in the first plane.

17. The non-transitory computer-readable storage medium according to claim 13, wherein in the first image and the second image, there are recognizable objects at the plurality of physical reference points, the first image is a first set of images comprising at least one image, the second image is a second set of images comprising at least one image, each image in the first set of images comprises the recognizable object corresponding to at least one of the plurality of physical reference points, all the images in the first set of images together comprise the recognizable objects corresponding to all the plurality of physical reference points, each image in the second set of images comprises the recognizable object corresponding to at least one of the plurality of physical reference points, and all the images in the second set of images together comprise the recognizable objects corresponding to all the plurality of physical reference points.

\* \* \* \* \*